Figure 1:
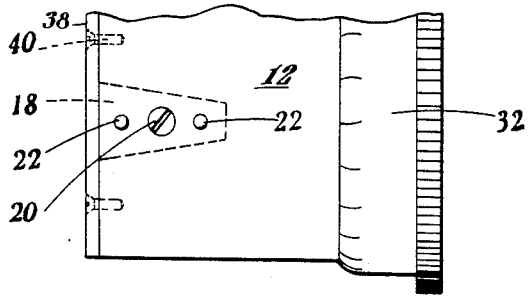

June 27, 1933.    R. S. ALLDRIDGE    1,916,132
CINEMATOGRAPH CAMERA
Filed Jan. 29, 1931

INVENTOR
R. S. Alldridge
BY
Sturtevant Mason Porter
ATTORNEYS

Patented June 27, 1933

1,916,132

UNITED STATES PATENT OFFICE

REGINALD STRATTEN ALLDRIDGE, OF HARROW, ENGLAND, ASSIGNOR TO RAYCOL BRITISH CORPORATION LIMITED, OF LONDON, ENGLAND, A BRITISH COMPANY

CINEMATOGRAPH CAMERA

Application filed January 29, 1931, Serial No. 512,162, and in Great Britain August 9, 1930.

This invention relates to compound cinematograph lenses of the kind used in colour cinematography and comprising at least two lenses in separate mounts, arranged side by side within a single lens barrel and provided with inclined guide surfaces which cause the separation of the lenses to be varied as a consequence of the focussing movement, with the object of avoiding or minimizing parallax. Such a compound lens is described in the specification of United States Patent No. 1,773,021, and in this example the guide surfaces are conical surfaces combined with flat parallel side surfaces intended to prevent lateral movement of the lenses.

It has been found very difficult to make a compound lens of this kind in which the focussing movement can be reversed during use without causing the images to move slightly out of register; the images remain in register while the lenses are moving continuously in one direction, for example while photographing an actor moving away from the camera, but if the movement is reversed, as for example when the actor turns and approaches the camera, there tends to be a momentary loss of correct register sufficient to cause false colour fringes in the projected image.

It is the object of the present invention to avoid this difficulty, and this is effected broadly by replacing the conical guide surfaces by flat surfaces. The flat parallel side surfaces being retained, the sliding surfaces of the lens mounts are consequently rectangular in cross-section and it has been found that with such a construction the tendency for loss of register on reversal of movement is much reduced or eliminated.

In the construction described in the specification mentioned above, the guide surfaces are maintained in contact by spring pressure acting through opposed conical surfaces. Similar means may be employed in lenses made according to the present invention, but it is preferred to employ positive means for maintaining contact when there are two lenses only, such means constituting a further feature of the invention and consisting of a wedge-shaped member co-operating on its opposite edges with inwardly-facing guide-surfaces one on each of the two lens mounts, at the side thereof, each surface being made parallel to the outwardly-facing sliding surface of the corresponding mount. The angle of the wedge being such that its edges fit the inwardly-facing guide-surfaces, it is readily seen that it may easily be set or adjusted parallel to the axes of the lenses so as to eliminate back-lash and looseness, thereby providing a means of positively holding the main guide surfaces always in contact.

Preferably there are two wedge-shaped members, one on either side of the lens mount, and they may be independently adjustable and provided with locking means such as screws.

Figure 2:
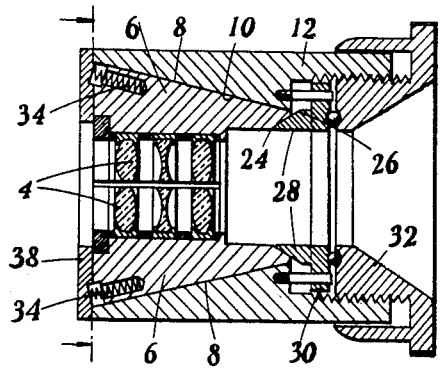
Figure 3:
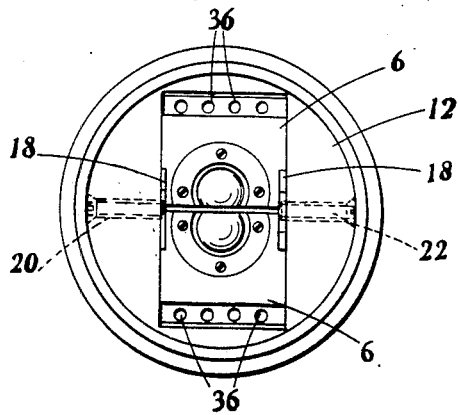
Figure 4:
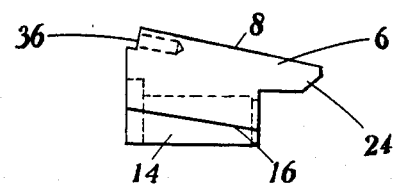

A construction according to this invention is illustrated by way of example in the accompanying drawing, in which Figure 1 is a side elevation of the lens, Figure 2 is a cross-sectional side elevation, Figure 3 is an end elevation, with the rear cover-plate removed, looking in the direction of the arrows III in Figure 2, and Figure 4 is a side elevation of one of the lens mounts.

The two lenses 4 are carried by mounts 6 having flat inclined guide-surfaces 8 co-operating with similarly inclined guide surfaces 10 within the lens barrel 12. The lateral surfaces of these mounts are also flat, and parallel to one another, and they are a close fit within opposed parallel surfaces within the barrel, as clearly shown in Figure 3.

Each side of each lens mount is recessed as shown at 14 in Figure 4, the edges 16 of the recesses being made accurately parallel to the surface 8. When the mounts are in place in the barrel these edges define wedge-shaped spaces between them, one on each side, and these spaces are occupied by wedges 18 secured within the barrel by means of screws 20 and dowels 22. The inclined edges of these wedges are made accurately to the same angle as the surface 16, and they are so located within the barrel that the mounts 6 can slide readily without slackness. If desired, the wedges may be mounted so as to be adjustable lengthwise in the barrel, so that the desired absence of slackness may be readily secured; for example they may be held by screws extending through holes in the barrel which are slightly larger than the barrel (the dowels 22 being omitted) so that by slackening the screws the wedges may be adjusted by tapping or otherwise after which the screws are again tightened.

At their front ends the mounts are undercut to provide inclined surfaces 24 engaged by the correspondingly inclined surfaces 26 of projections 28 formed on an annulus 30 which is moved longitudinally by a screw-threaded focussing sleeve 32 as described in the specification of co-pending application No. 512,161 filed January 29th, 1931, but it would be within the scope of the present invention to arrange the focussing sleeve to bear directly against the front ends of the mounts. In either case the mounts are urged in the forward direction by means of compression springs 34 housed in blind holes 36 in the rear ends of the mounts and abutting against a cover plate 38 fixed to the rear end of the lens barrel by screws 40.

It will be appreciated that owing to the fact that all the guide surfaces for the mounts 6 are flat, the possibility of rotation or skewing of the mounts is reduced to a minimum.

The springs, instead of bearing directly against the mounts as shown, may be arranged to bear against an annulus, similar to the annulus 30, provided with projections having inclined surfaces on the rear ends of the mounts. In this case the surfaces 8, 10 will be held in engagement by the reactions at these inclined surfaces and at the surfaces 24, 26, and the recesses 14 and the wedges 18 can then be dispensed with.

I claim:—

1. A compound cinematograph objective comprising in combination at least two lenses having spaced parallel axes, mounts for said lenses having outwardly-facing guide surfaces on those sides thereof remote from one another, which guide-surfaces are inclined to the axes of the lenses, and having further guide-surfaces parallel to the surfaces first mentioned and facing inwardly, a supporting lens barrel surrounding said lens mounts, having inwardly-facing internal guide surfaces inclined with respect to the lens axes and fitting the outwardly-facing guide-surfaces on the lens mounts and having outwardly-facing internal guide-surfaces inclined with respect to the lens axes and fitting the inwardly-facing guide-surfaces on the lens mounts, manually-operated means within the lens barrel engaging the ends of said mounts adapted to move said lens mounts lengthwise of the lens barrel, and resilient means maintaining the lens mounts in engagement with said means.

2. A compound cinematograph objective comprising in combination a supporting lens barrel having two opposed flat internal guide surfaces inclined to the axis of the lens barrel at equal angles, and two opposed flat internal surfaces parallel to said axis, two wedges fixed to the said parallel surfaces, one on each surface, having their outwardly facing edges parallel to the said inclined surfaces opposed thereto, and two lens mounts, each supporting a lens, disposed side by side within the lens barrel and each formed with flat inclined guide-surfaces co-operating with the inclined guide-surfaces within the lens barrel and with parallel lateral surfaces recessed to provide inwardly-facing inclined guide-surfaces co-operating with the edges of the said wedges.

3. A compound cinematograph objective comprising in combination a supporting lens barrel having two opposed internal guide surfaces inclined to the axis of the lens barrel at equal angles, and two opposed internal surfaces parallel to said axis, two wedges adjustably secured one to each of said parallel surfaces and having its edges opposed to and parallel with the inclined surfaces aforesaid, and two lens mounts each supporting a lens and disposed side-by-side within the lens barrel and each provided with opposed inclined parallel guide surfaces co-operating with one of the aforesaid inclined surfaces within the lens barrel and with the edges of the two wedges opposed to that surface.

In witness whereof I hereunto subscribe my name this sixth day of January, A. D. 1931.

REGINALD STRATTEN ALLDRIDGE.